(12) United States Patent
Grotz (10) Patent No.: US 8,792,820 B2
(45) Date of Patent: Jul. 29, 2014

(54) SATELLITE TRANSCEIVER (75) Inventor: Joel Grotz, Betzdorf (LU)

(73) Assignee: SES Astra S.A., Betzdorf (LU)

( * ) Notice: Subject to any disclaimer, the term of this patent is extended or adjusted under 35 U.S.C. 154(b) by 919 days.

(21) Appl. No.: 12/933,151

(22) PCT Filed: Mar. 19, 2009

(86) PCT No.: PCT/EP2009/053246
§ 371 (c)(1),
(2), (4) Date: Dec. 6, 2010

(87) PCT Pub. No.: WO2009/115573
PCT Pub. Date: Sep. 24, 2009

(65) Prior Publication Data
US 2011/0111692 A1    May 12, 2011

(30) Foreign Application Priority Data

Mar. 20, 2008 (EP) .................................... 08005308

(51) Int. Cl.
*H04B 7/185* (2006.01)

(52) U.S. Cl.
USPC .......... 455/12.1; 455/3.02; 455/427; 370/316

(58) Field of Classification Search
CPC ........... H04B 7/19; H04H 40/90; H04N 7/20; H01P 1/161; H01Q 1/247; H01Q 25/001
USPC ................. 455/12.1–13.3; 370/316
See application file for complete search history.

(56) References Cited

U.S. PATENT DOCUMENTS

| 4,723,321 | A | 2/1988 | Saleh |
| 5,485,485 | A | 1/1996 | Briskman et al. |
| 5,513,222 | A | 4/1996 | Iwasaki |
| 5,568,158 | A | 10/1996 | Gould |
| 6,009,307 | A | 12/1999 | Granata et al. |
| 6,344,832 | B1 * | 2/2002 | Lotfy ............................ 343/786 |

(Continued)

FOREIGN PATENT DOCUMENTS

| EP | 0 416 264 A | 3/1991 |
| EP | 1089 469 A | 4/2001 |

(Continued)

OTHER PUBLICATIONS

Search Report and Written Opinion mailed Oct. 5, 2009 for International Application No. PCT/EP2009/053246.

(Continued)

*Primary Examiner* — Raymond Dean
(74) *Attorney, Agent, or Firm* — Wolf, Greenfield & Sacks, P.C.; William R. McClellan (57) ABSTRACT

A transceiver receives linearly polarized signals from two geostationary satellites. The transceiver includes a first and second waveguide to form two receiving beam patterns with a maximum gain in angular directions different from each other. At one end of each waveguide, two receiving elements orthogonal to each other are provided. Four converting units convert, using a common local oscillator, the carrier frequency of the four signal components received from the two pairs of receiving elements into an intermediate frequency. A combining unit linearly combines the converted signal components, based on weights representing phase shifting and/or amplification of signal components. A weight input unit receives the weights to be used in the combining unit.

26 Claims, 6 Drawing Sheets

(56) References Cited

U.S. PATENT DOCUMENTS

| | | |
|---|---|---|
| 6,504,504 B1 | 1/2003 | Tits et al. |
| 2002/0150185 A1 | 10/2002 | Meehan et al. |
| 2004/0051676 A1 | 3/2004 | Travis et al. |
| 2005/0276239 A1 | 12/2005 | Smallcomb et al. |
| 2005/0285784 A1 | 12/2005 | Chiang et al. |
| 2006/0202890 A1 | 9/2006 | Otto |
| 2007/0019117 A1 | 1/2007 | Nakano |

FOREIGN PATENT DOCUMENTS

| | | |
|---|---|---|
| EP | 1 298 759 A2 | 4/2003 |
| GB | 1 326 235 | 8/1973 |
| WO | WO 2006/019896 A2 | 2/2006 |
| WO | WO 2007/084389 A | 7/2007 |

OTHER PUBLICATIONS

Winters, J.H., "Optimum Combining in Digital Mobile Radio with Cochannel Interference", IEEE Journal on Selected Areas in Communications, vol. SAC-2, No. 4, Jul. 1984.

Taylor, Ralph E., "Automatic Electronic Polarization Tracking System", Goddard Space Flight Center, Greenbelt, MD, X-523-67-302, Jun. 1967.

Schwarzenbarth et al., "MMSE Based Interference Processing for Satellite Broadcast Reception", Proceedings IEEE Vehicular Technology Conference, Mar. 2007, 5 pages.

Grotz et al., "Applicability of Interference Processing to DTH Reception", $9^{th}$ International Workshop on Signal Processing for Space Communications, Sep. 2006, p. 1-10.

Lal C. Godara, "Application of Antenna Arrays to Mobile Communications, Part II: Beam-Forming and Direction-of-Arrival Considerations", Proceedings of the IEEE, vol. 85, No. 8, Aug. 1997, pp. 1195-1217.

Liolis et al., "Multi-Satellite MIMO Communications at Ku-Band and Above: Investigations on Spaatial Multiplexing for Capacity Improvement and Selection Diversity for Interference Mitigation", EURASIP Journal on Wireless Communications and Networking, vol. 2007, Article ID 59608, 11 pages.

Sergio Verdú, Chapter 4.2 "Optimum Detector for Asynchronous Channels", Multiuser Detection, Cambridge University Press, 1998, pp. 166-175.

Sergio Verdú, Chapter 6.6 "Blind MMSE Multiuser Detection", Multiuser Detection, Cambridge University Press, 1998, pp. 318-325.

Sergio Verdú, Chapter 7 "Decision-Driven Multiuser Detectors", Multiuser Detection, Cambridge University Press, 1998, pp. 370-384.

Office Action dated Feb. 10, 2014 from corresponding European Application No. EP 08005308.

\* cited by examiner

SATELLITE TRANSCEIVER

FIELD OF TECHNOLOGY

The present invention relates to satellite communication, including, but not limited to, fixed satellite reception. It may be applicable for instance for reception and transmission in the contexts of direct broadcasting reception, direct-to-home (DTH) reception or very small aperture terminal communication (VSAT) transmission.

BACKGROUND

Satellite communication technology includes the transmission of radiofrequency signals from a satellite directly to antennas arranged at end-user premises. Such type of transmission is sometimes referred to as direct-to-home (DTH) satellite transmission, and usually implies the use of a satellite dish reflector with a low noise block (LNB) receiver. The satellite may for instance be a geostationary satellite orbiting the earth. Direct-to-home (DTH) satellite transmission offers specific advantages while involving specific technical requirements and challenges.

The use of direct-to-home (DTH) satellite communications offers the following advantages. No terrestrial channel, such as a cable or wire, is required to provide communication to the end-user premises so that broadcast transmission can take place to virtually every place on earth. The use of high frequency signals in a line-of-sight (LOS) manner may provide high bandwidth and transmission rate communication.

Direct-to-home (DTH) satellite communications also involve specific technical requirements and challenges. The receiving antenna's reflector must be as small as possible, to minimise the visual and aesthetic impact of the reflector without impairing quality of reception. Therefore, the receiving apparatus interacting with the reflector must be as efficient as possible, so as not to affect the signal quality. The receiver should also be as simple as possible to reduce its cost. At the same time, the setting up and adjustment of the orientation of the receiving antenna at the end-user side should be as easy as possible and the receiver should have a high tolerance to pointing errors.

Radiofrequency signals broadcasted from satellites are often linearly polarized, for reuse of frequency bandwidth. That is, two orthogonally polarized signals on the same bandwidth are transmitted from the satellite. Misalignment of the polarization reception elements of the antenna and the polarization of the incoming signal affects the signal quality and is therefore undesirable.

One way to avoid misalignment of the polarization reception elements of the antenna with respect to the polarization of the incoming signal is by mechanically rotating, i.e. tilting, the receiver to align the receiving elements with the polarization of the incoming signal. This usually requires either delicate manual adjustment procedures or relatively expensive electromechanical means for rotating the receiver. Such electromechanical steering means, which should usually be adapted for outdoor environments, i.e. arranged by the satellite antenna, may be subject to mechanical failures. Another way to cope with a misalignment of the polarization reception elements and the polarization components of the incoming signal is by using electronic means.

U.S. Pat. No. 5,568,158 discloses an electronically adaptable polarization antenna feed apparatus. An electronic circuit is adapted to the apparatus for reception of polarized radiofrequency (RF) signals. Through the use of a combiner and variable gain amplifiers or attenuators, the signals from two orthogonally polarized signal paths are combined such that a maximum signal-to-noise ratio is obtained for a desired polarization.

There is a constant need for improving such apparatus in view of the above-mentioned technical requirements and challenges, including, but not limited to, antenna pointing accuracy and polarization alignment.

SUMMARY

The present invention aims at meeting or at least partially meeting the above-mentioned needs.

According to the invention, a transceiver is configured for receiving linearly polarized signals from at least two geostationary satellites. The transceiver includes at least a first waveguide and a second waveguide configured to respectively form with a reflector two beam patterns with a maximum gain in angular directions different from each other. At one end of each one of the at least first waveguide and second waveguide, the transceiver includes two transceiving elements, i.e. transmitting and/or receiving elements, orthogonal to each other configured for respectively receiving, and/or transmitting, two orthogonal polarization components of the signals. The transceiver thus includes at least four transceiving elements configured for receiving, and/or transmitting, at least four corresponding signal components. The transceiver also includes at least four converting units each configured for converting, by using a common local oscillator, one of the at least four signal components to an intermediate frequency. The at least four converting units thus output at least four corresponding converted signal components. Furthermore, the transceiver includes a combining unit configured for linearly combining the at least four converted signal components, based on weights representing phase shifting and/or amplification of signal components. The transceiver includes a weight input unit configured for receiving the weights.

The transceiver of the invention is suitable for receiving signals bearing the same content and originating from at least two different geostationary satellites. The signals are constructively combined to improve the signal quality. This enables to reduce the size of the receiving antenna's reflector, for instance the diameter of the satellite dish. As an equally suitable application, with no need to adapt or change the hardware equipment, such transceiver may also be used for receiving signals bearing different content and respectively originating from at least two different geostationary satellites.

In addition, the same multi-waveguide transceiver of the invention may be used at different geographical areas on earth without requiring hardware modification. This enables to manufacture identical transceivers for use in different geographical areas. This particular advantage will be explained in more details below with reference to the Figures, but may be summarized as follows.

The orthogonal polarization components of the signals transmitted from a satellite, such as a geostationary satellite, are projected on the earth with different angular orientations depending on the location on earth. Besides, let us consider two satellites positioned at different locations above the earth, such as at different locations on the geostationary orbit, and let us consider two different locations on earth from which the two satellites are viewed, namely a first location on earth and a second location on earth. The change from the first location on earth to the second location on earth of the angular orientation of the projected polarized components of the signals transmitted from each one of the satellites differs from each other.

This means that a transceiver which would have two pairs of orthogonal receiving elements oriented to match, when located in one geographical area on earth, the orientation of the polarization components of the incoming signals, could not be simply tilted so as to match the orientation of the polarization components of the incoming signals in another geographical area on earth. Such a transceiver would have to be adjusted, by individually tilting each one of their pairs of receiving elements (this will be further explained with reference to the drawings, especially FIGS. 2 and 3).

The transceiver of the invention provides a generic multi-waveguide transceiver for receiving linearly polarized satellite communication from two different satellites, wherein the transceiver need not be tailored to a particular geographical reception area.

The weight-based combination in the transceiver of the invention does not only enable polarization matching to maximize the signal quality for reception by each waveguide or feed horn, but also enables additional fine-tuning of the directivity of the global beam formed by the plurality of waveguides. The possibility to adjust the directivity of the transceiver in a global manner by adjusting the weights used for combining the signal components enables to mitigate interference from other signal sources. It also enables to mitigate the effects of destructive interference in certain angular directions, upon reception, between the signals coming from the geostationary satellites themselves.

The transceiver of the invention also enables adjustment of the polarization orientation to avoid potential cross polarization interference over the overall beam formed by the plurality of waveguides.

In other words, the signal quality may be optimized both by polarization selection and directivity adjustment.

In the transceiver of the invention, linearly combining the signals after downconverting them into an intermediate frequency allows the use in the combining unit of lower-frequency components, which are cheaper and less prone to affect the signal quality. The use of the same local oscillator for downconverting the signal components allows coherent combination in the combining unit. The complex weightings thus enable amplitude adjustment and phase shifting in a coherent manner, to provide constructive combination of the signal components.

A further advantage of the invention is that different simultaneous satellite position constellations may be addressed with the same transceiver.

According to one embodiment, the first waveguide, the second waveguide and the associated transceiving elements of the transceiver are included in a single housing.

Integrating the two waveguides and the associated transceiving elements within a single housing enables to provide a robust transceiver wherein the first waveguide, the second waveguide and the associated transceiving elements are fixedly arranged with respect to each other. Since the use of a weight-based combining unit enables to compensate for the fixed positional relationship between the two pairs of transceiving elements, without any significant reduction of the signal quality, the same transceiver according to this embodiment may be used in different geographical areas. This is especially advantageous for use in different geographical areas wherein the projection of the polarization components of the signals transmitted from the two satellites are different for each satellite, and wherein the amount of angular variation of the projection of the polarization components from one location to the other is different depending on the considered satellite.

This embodiment also addresses the following problem. Polarization alignment is a delicate problem for multiple satellite reception using a single integrated reception unit (a monoblock unit). Without the invention, the configuration of the single integrated unit should be adjusted at the time of design and manufacturing with a correct relative polarization orientation and polarization orientation difference corresponding to the satellites from which signals are to be received. In order to meet this requirement while still being able to manufacture a single integrated unit for use in a large geographical area (for economies of scale), an approach would be to sacrifice the adjustment accuracy, which would be undesirable. The embodiment of the invention does not require such undesirable adjustment.

Besides, the mechanical, fixed adjustment of the polarization orientation of an antenna is prone to installation errors. It also requires mechanical or electromechanical means to enable to conveniently carry out such an adjustment, adding to the equipment costs needed for antenna mounting. This problem exists in particular for waveguide horn-based reception antennas which may require a tilting mechanism for accurate polarization adjustment.

In one embodiment, the weight input unit is configured for receiving the weights from an external unit. The external unit may be a set-top box.

When setting up the satellite transceiver at an end-user home for instance, the user may be prompted to enter in, i.e. to provide to, the set-top box, directly or through a computer for instance, information regarding its location on earth. The information regarding the location may include the latitude or the longitude. Alternatively, or in addition, the location on earth may be derived from the address of the end user or the like. The address may be provided by the user at the time of setting up the transceiver.

Based on the information indicating the location where the transceiver is set up, the set-top box may then provide, to the weight input unit of the transceiver, weights adapted to optimally receive linearly polarized signals from two or more given geostationary satellites by its plurality of pairs of receiving elements.

The weights may also be automatically transmitted from an external unit such as a set-top box, based on information gathered through a satellite navigation system providing geospatial positioning information, such as the global positioning system (GPS), or the Galileo positioning system scheduled to be operational in the future.

In one embodiment, the transceiver is configured for updating the weights after receiving them from the external unit, which may be a set-top box. This enables adjustment of the weights to optimally combine the polarization components transmitted from the satellite, to cope with potential positional errors when setting up the transceiver and the associated reflector. The fine-tuning also enables to adjust the weights to cope with interfering signals from other sources, or interfering obstacles in the line of sight (LOS) to search for the best combination, i.e. the combination of weights leading to the signal having the highest quality.

In one embodiment, the first waveguide and the second waveguide have transceiving (receiving and/or transmitting) beam patterns with a maximum gain in angular directions separated by between 1, 5 and 10 degrees from each other. This enables to receive (or transmit) signals from two adjacent satellites on the geostationary orbit, which are separated by between 1, 5 and 10 degrees from each other with respect to the earth. Receiving signals from such satellites is advantageous in that the phase shift between the signals received from the two satellites may be relatively small (when receiving signals bearing the same content from the satellites).

The invention also relates to a transceiver configured for transmitting linearly polarized signals to at least two geostationary satellites. The transceiver includes at least a first waveguide and a second waveguide configured to respectively form with a reflector two transmitting beam patterns with a maximum gain in angular directions different from each other. The transceiver also includes at one end of each one of the at least first waveguide and second waveguide, two transmitting elements orthogonal to each other configured for respectively transmitting two orthogonal polarization signal components, and thus forming at least four transmitting elements configured for transmitting at least four corresponding signal components. The transceiver further includes at least four converting units configured to output together the at least four corresponding signal components, by each converting into a carrier frequency, using a common local oscillator, one of at least four signal components to be converted. The transceiver yet further includes a splitting unit configured for outputting the at least four signal components to be converted, based on weights representing phase shifting and/or amplification. The transceiver also includes a weight input unit configured for receiving the weights.

The invention also relates to the use of the above transceiver for receiving and/or sending linearly polarized signals from and/or to at least two geostationary satellites.

The invention also relates to a computer program configured, when executed on the above transceiver, to cause instructions to be carried out to update the weights after receiving them from an external unit.

The invention also relates to a set-top box, or a unit, configured for sending weights to and for use by a transceiver as described above.

In one embodiment, the invention is applied to very small aperture terminals (VSAT) systems. VSAT systems are used for narrowband or broadband data communications with satellites on the geostationary orbit, including, but not limited to, two-way satellite real-time internet communication, video conferencing, etc.

Polarization adjustment and alignment of VSAT terminals, earth station antennas, is a delicate, time-consuming and therefore expensive operation. The operation typically requires involving trained professionals upon installation of the terminals to ensure that polarization, azimuth and elevation of the antenna are accurately adjusted with respect to the incoming satellite signals. Moreover, after installation and throughout the lifespan of the terminals, subsequent verification and adjustment of the antenna alignment are usually required to compensate for movements caused by strong winds, vibrations, long-term deformations, or the like. For these verifications and adjustments, trained professionals are generally also involved to maintain the installation quality. The interferences resulting from badly pointed antennas and from cross-polarization is a technical problem, which the invention, according to one embodiment, helps to address.

BRIEF DESCRIPTION OF THE DRAWINGS

Embodiments of the present invention shall now be described, in conjunction with the appended Figures in which.

DETAILED DESCRIPTION

The present invention shall now be described in conjunction with specific embodiments. It may be noted that the specific embodiments serve to provide the skilled person with a better understanding, but are not intended to in any way restrict the scope of the invention, which is defined by appended claims. In particular, the embodiment described independently throughout the description can be combined to form further embodiments to the extent that they are not mutually exclusive.

Figure 1A:
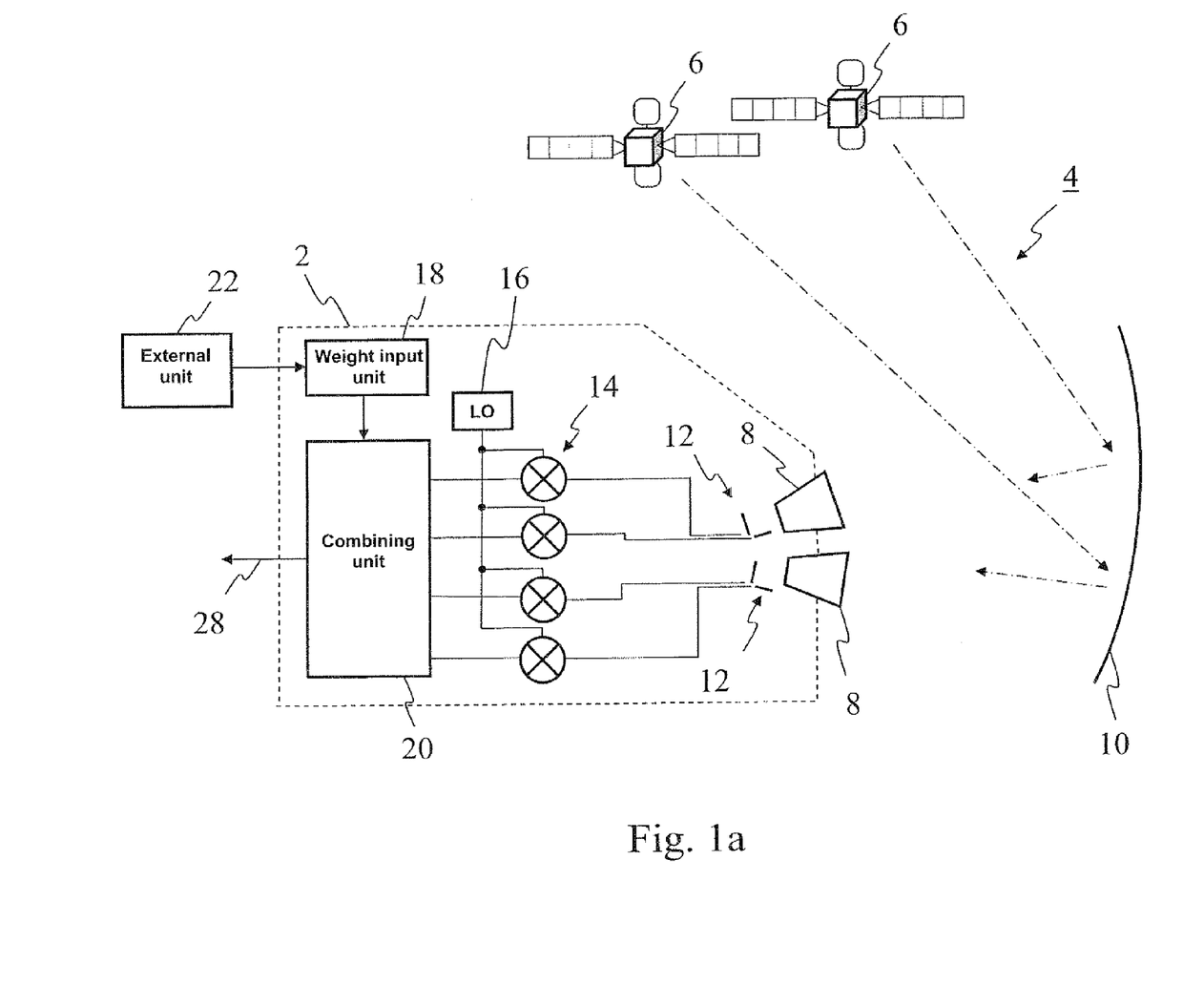
FIGS. 1a and 1b schematically illustrate transceivers according to two embodiments of the invention.

FIG. 1a schematically illustrates an embodiment of a transceiver 2 according to the invention, along with two geostationary satellites 6, a reflector 10 and an external unit 22.

Each one of the two geostationary satellites 6 transmits linearly polarized radiofrequency signals 4 towards the earth or towards a particular geographical area of the earth. The transmitted signals may for instance be Ku-band signals. The two geostationary satellites 6 may receive signals from a hub (not illustrated) located on the earth, to then relay said signals 4 back to the earth.

The linearly polarized signals 4 transmitted from the satellites 6 are received via a reflector 10, such as a parabolic dish, by two waveguides 8 and their corresponding pairs of receiving elements 12 (or more generally transceiving elements) located at or near the focal point of the parabolic dish 10. The two waveguides 8, which may also be called feedhorns, are oriented to respectively form with the reflector 10 two receiving beam patterns with a maximum gain in angular directions different from each other. The first waveguide 8 forms with the reflector 10 a beam pattern with a maximum gain substantially in the direction of a first one of the satellites 6, while the second waveguide 8 forms with the reflector 10 a beam pattern with a maximum gain substantially in the direction of a second one of the satellites 6.

At one end of the first waveguide 8, two orthogonal receiving elements 12 are arranged. The function of these two orthogonal receiving elements 12 is mainly to receive combination of the two polarization components of the signals 4 transmitted from a first one of the geostationary satellites 6, reflected by the reflector 10 and guided by the first waveguide 8. Two other orthogonal receiving elements 12 are also arranged at the end of the second waveguide 8. The aim of these two additional orthogonal receiving elements 12 is mainly to receive the combination of the polarization components transmitted from the second geostationary satellite 6, reflected by the reflector 10 and guided by the second waveguide 8.

The first pair of receiving elements 12 arranged within the first waveguide 8 however also receives parts of the radiofrequency signals coming from the second satellite 6. Similarly, the second pair of receiving elements 12 arranged within the second waveguide 8 receives parts of the signals coming from the first satellite 6. Although the maximum gain of the receiving beam pattern of the first and second waveguides 8 are in different directions, the respective beam patterns have a width and non-negligible side lobes. In other words, while the maximum gain of the beam pattern associated with the first waveguide 8 is preferably in the direction of the first satellite 6 and the maximum gain of the beam pattern associated with the second waveguide 8 is preferably in the direction of the second satellite 6, the gain of the beam pattern associated with the first waveguide 8 in the angular direction of the second satellite 6 and the gain of the beam pattern associated with the second waveguide 8 in the angular direction of the first satellite 6 are not necessarily negligible.

The four received signal components, received from each one of the receiving elements 12 are downconverted into an intermediate frequency (IF) using a common local oscillator (LO) 16 and a series of mixers 14. The downconversion using a common local oscillator 16 provides coherent translation to an intermediate frequency. The downconversion may consist in converting the Ku-band signal to an intermediate L-band frequency. The local oscillator 16 may for instance oscillates at 9.75 GHz for low band or/and 10.6 GHz for high-band selection (see also FIG. 4).

The downconverted signals are then fed into a combining unit 20 configured for linearly combining the converted signal components based on weights representing phase shifting and/or amplification of signal components. That is, in the combining unit 20, the converted signal components are phase shifted and amplified according to weights, namely complex weights. This may be done using electronic phase shifters, such as variable delay lines, and amplifiers, such as variable gain amplifiers. This enables to constructively combine the input signal components to form an output combined signal 28 (illustrated by the arrow originating from the left side of combining unit 20 on FIG. 1a) having a higher signal-to-noise ratio than the input downconverted individual signals received at the combining unit 20.

There may for instance be two 0-180 degrees phase shifters and two 0-10 dB amplifiers in the combining unit 20. The combining unit 20 may be controlled by a controller unit, such as a microcontroller (not illustrated) including the weight input unit 18.

The weights used by the combining unit 20 may be received by a weight input unit 18 from an external unit 22. The external unit 22 may be a set-top box.

While only one arrow originating from the left side of combining unit 20 on FIG. 1a is represented, the combining unit 20 may provide more than one distinct output signal 28 synthesized based on distinct sets of complex weights. The distinct sets of complex weights may all be provided through the same weight input unit 18 or through different weight input units 18 (not illustrated). In one embodiment, a first set of complex weights is provided to the combining unit 20 for optimizing signal reception from a first one of the satellites 6 and a second set of complex weights is provided to the combining unit 20 for optimizing signal reception from a second one of the satellites 6. More than two sets of weights may be provided.

In one embodiment, the weights are stored in a non-volatile memory of the external unit 22, such as a set-top box (STB), which is a practical solution. Other embodiments for storing the weights are possible.

In one embodiment, a demodulator and a decoder are integrated with the antenna unit or transceiver 2. This simplifies the transceiver design. A tuner unit is provided in each one of the reception paths. Each one of the tuner units would translate each signal to the baseband. The subsequent phase shifting and amplitude adjustment may be carried out prior to demodulation, as a skilled person would recognize it.

In the transceiver 2, between the receiving elements 12 and the mixers 14, low noise amplifiers and filters may be provided to process the signals before downconversion to the intermediate frequency (not illustrated in FIG. 1a).

In one embodiment, the transceiver 2 is adapted for fixed reception. That is, the transceiver 2 and the orientation of the waveguides 8 are fixed with respect to the earth surface and the geostationary satellites 6.

In addition, the waveguides 8 and the pairs of receiving elements 12 may be integrally formed within a single housing making up the transceiver 2, for robustness.

In one embodiment, the transceiver 2 is adapted to receive signals 4 from more than two geostationary satellites 6, using a corresponding number of pairs of receiving elements 12.

In one embodiment, herewith referred to as the "baseband embodiment", the combination unit 2 is configured to operate as follows. Each input signal is translated into the baseband and a frequency tuner is provided for each input signal. The signals in baseband are digitally processed to correct their phase and amplitude. In addition, the digital signals may be passed on to a demodulator chipset that operates as subsequent unit on the signal. This implementation requires either a cable for each signal from the LNB to the STB or an integration of the transceiver 2 within the antenna.

In one embodiment, herewith referred to as the "intermediary frequency (IF) band embodiment", the weight-based combination is carried out in the intermediary frequency (IF) band, for instance at around 900 MHz-1.5 GHz. The phase shifting may be implemented by a set of integrated, switched delay-lines or active phase shifting units. The delay-line-based implementation is relatively cheap.

In one embodiment, herewith referred to as the "radio frequency (RF) band embodiment", the weight-based combination is carried out at the transmission frequency (carrier frequency for transmission into the physical medium, e.g. Ku band). This implies relatively expensive implementation of variable phase shifting systems in the radio frequency (RF) band. This embodiment is however possible for instance using components developed in the context of microelectromechanical systems (MEMS), which may allow a cheap implementation also in the radio frequency (RF) band.

In one embodiment (not illustrated in FIG. 1a), the weights sent from the external unit 22 to the weight input unit 18 are externally computed by assuming a perfectly pointed antenna at a given location. This estimate captures the signal and reads some of its content. Then, after reception of the initial weights, a mechanism (such as for instance computer-implemented adjustment mechanism) helps to converge to the best value by slightly changing (updating) the weighting by a small delta and observing a quality metric, e.g. signal-to-noise ratio. Using optimization techniques, like gradient descent methods, a new weighting factor may be computed to slowly approach the optimal settings. After the optimal values are reached, this iteration steps may be repeated from time to time to guarantee that no external factors (wind, etc.) have caused the antenna to misalign over time.

Figure 1B:
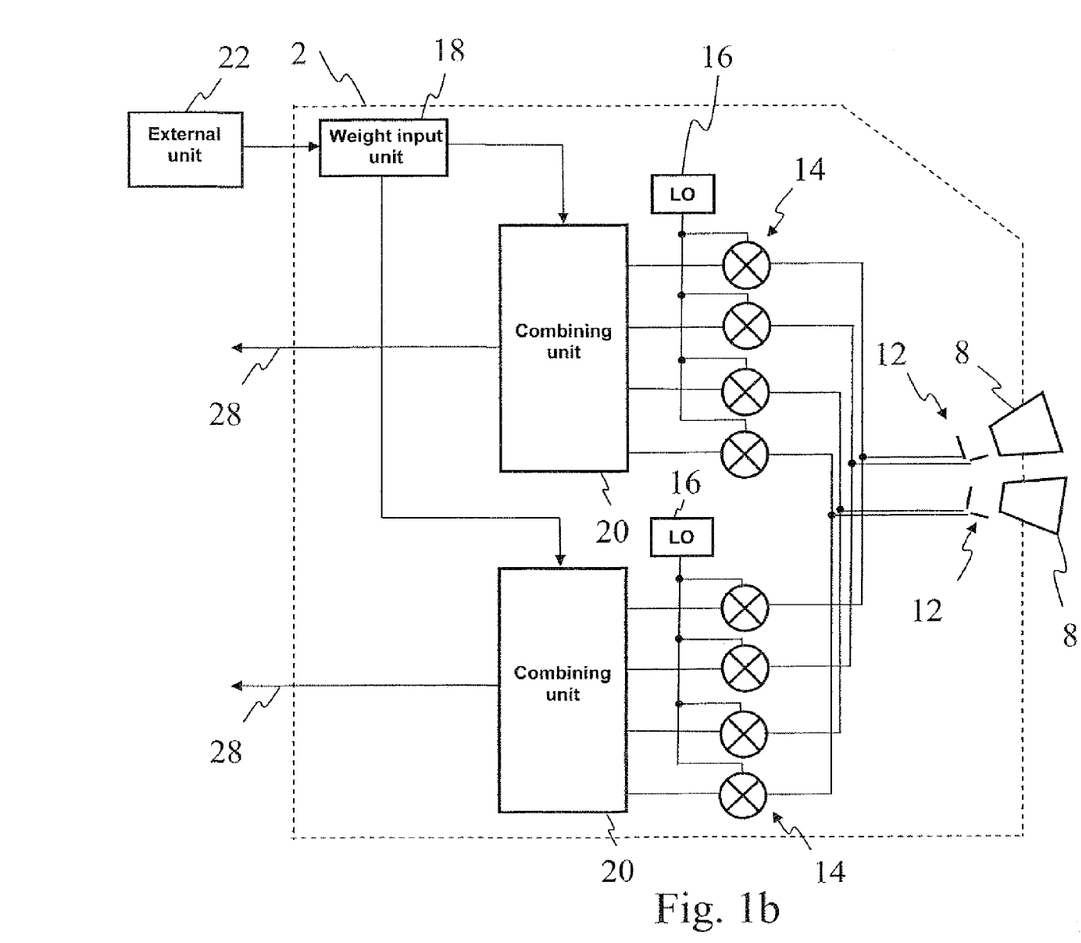

In FIG. 1b, one embodiment of the invention is illustrated. The reflector 10 and satellites 6 are not illustrated for the sake of clarity. Two combining units 20 are provided, wherein each one is configured for outputting en output signal 28 based on weights received from the weight input unit 18. Two weight input unit 18 may however be provided (not illustrated). For any technical reasons, each combining unit 20 may have a respective set of mixers 14 and a respective local oscillator 16 as illustrated in FIG. 1b. However, a common set of mixers 14 and a common local oscillator 16 may be provided for both combining units 20 (not illustrated).

Still with reference to FIG. 1b, a first one of the combining units 20 may be configured for outputting a signal 28 estimating and representing the signal sent from a first one of the satellites 6, while a second one of the combining units 20 may be configured for outputting a signal 28 estimating and representing the signal sent from a second one of the satellites 6. Distinct sets of weights are provided to do so.

The advantages of the transceiver 2 will now be further explained with reference to the front views of the waveguides 8 and receiving elements 12 schematically illustrated in FIG. 2.

Figure 2:
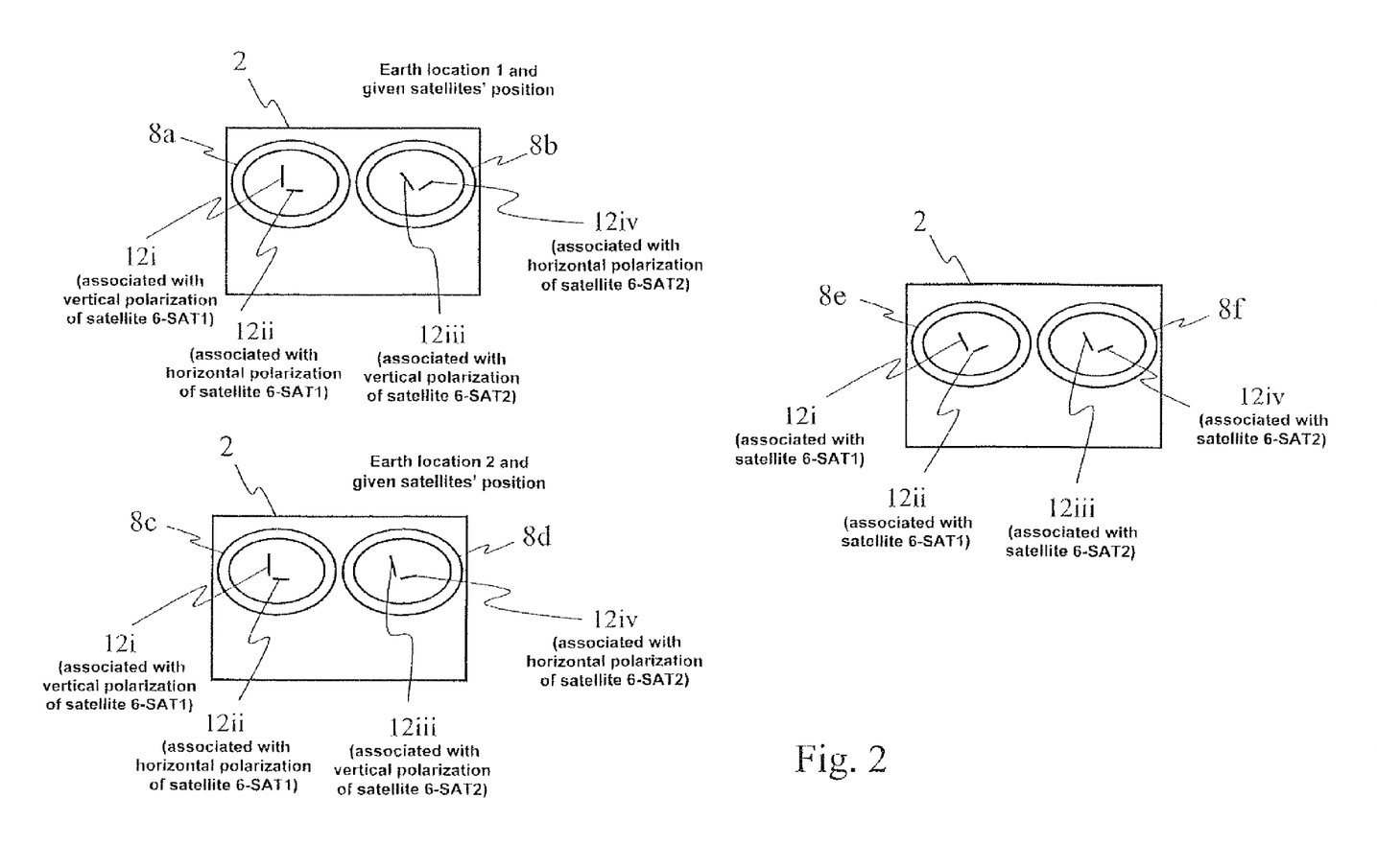
FIG. 2 schematically illustrates front views of transceivers with pairs of transceiving elements (receiving and/or transmitting elements) to explain the advantages of the invention.

On the left-hand side of FIG. 2, front views of two transceivers 2 are shown, each transceiver 2 being provided with two waveguides 8 and two pairs of receiving elements 12. The waveguides 8 are shown to have an oval shape, but may have a different shape such as a circular or rectangular shape.

The top left view of FIG. 2 shows the front view of a transceiver 2 adapted to receive signals 4 (not illustrated) from two different geostationary satellites 6-SAT1, 6-SAT2. A first receiving element 12i within a first waveguide 8a is oriented to match the orientation of the vertical polarization component of the signal transmitted from the first satellite 6-SAT1. A second receiving element 12ii orthogonal to the first receiving element 12i is also arranged within the first waveguide 8a and the second receiving element 12ii is oriented to match the orientation of the horizontal polarization component of the signal transmitted from the first satellite 6-SAT1.

Within the second waveguide 8b, two additional receiving elements 12iii, 12iv are provided. The first receiving element 12iii is orientated to match the orientation of the vertical polarization component of the signal from the satellite 6-SAT2 and the second receiving element 12iv is oriented to match the orientation of the horizontal polarization component of the signal from the second satellite 6-SAT2.

From one location or geographical area on earth to another location or geographical area on earth, the projection on the earth surface of the horizontal and vertical polarization components of the signals coming from the two geostationary satellites 6 change in a different manner. As a result, relying on the mere tilting of the dual-feedhorn transceiver 2 for use in different geographical areas may lead to misalignment of at least one of the two pairs of receiving elements 12. In other words, for providing good matching between the orthogonal receiving elements 12 of the two waveguides 8 and the incoming linearly polarized signals from the two satellites 6, another transceiver 2 with different relative angular orientation of the two pairs of receiving elements 12 is required for efficient use in a second earth location. In other words, another transceiver 2 with a different hardware design is required.

Such other transceiver 2 is illustrated at the bottom left of FIG. 2. It is configured to be arranged at a second earth location. It comprises two waveguides 8c, 8d. The first waveguide 8c includes two orthogonal receiving elements 12i, 12ii. The orientation of the first receiving element 12i is intended to match the orientation of the vertical polarization component of the signal from the first satellite 6-SAT1 and the orientation of the second receiving element 12ii is intended to match the orientation of the horizontal polarization component of the signal from the first satellite 6-SAT1. The second waveguide 8d includes two orthogonal receiving elements 12iii, 121v. The orientation of the receiving element 12iii is intended to match the orientation of the vertical polarization component of the signal from the second satellite 6-SAT2 and the orientation of the receiving element 12iv is intended to match the orientation of the horizontal polarization component of the signal of the second satellite 6-SAT2.

On the left-hand side of FIG. 2, two different transceivers are provided for use at two different earth locations so that the polarization planes of the incoming signals and of the receiving components match.

On the right-hand side of FIG. 2, a front view of a transceiver 2 according to one embodiment of the invention is illustrated. In this transceiver 2, two waveguides 8e, 8f are associated with two pairs of receiving elements 12. Each pair of receiving elements 12 is mainly associated with one satellite. The pair of receiving elements 12i, 12ii within the waveguide 8e is associated with the first satellite 6-SAT1, while the pair of receiving elements 12iii, 12iv within the waveguide 8f is associated with the second satellite 6-SAT2.

In such a transceiver 2, wherein a combining unit 20 is provided, as described above, the same hardware configuration may be used for different geographical areas, by using different weights corresponding to different geographical areas. The orientation of each individual pair of receiving elements 12 may be arbitrary and need not match the orientation of the incoming polarization signal components from the satellites 6. The weight-based combination of the signal components received from the receiving elements 12 enables to recover and to constructively combine the linearly polarized components of the incoming signals from the satellites 6. In other words, the optimal weight-based combination determines the resulting polarization angle of the received signal.

Figure 3:
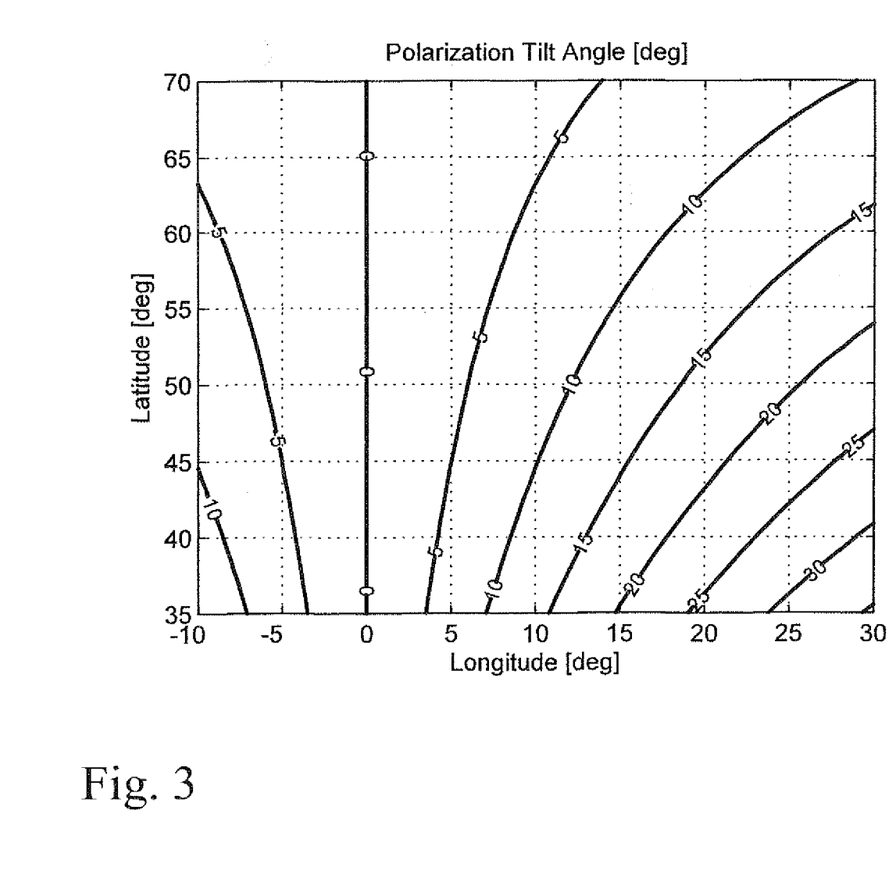
FIG. 3 illustrates an example of how the polarization may be adjusted during the installation of an antenna having a single low noise block (LNB), and a map as an example of the ideal polarization alignment (polarization tilt angle) with respect to one specific satellite over Europe.

To further illustrate one of the problems addressed by the invention, FIG. 3 shows an example of how the polarization may be adjusted during the antenna setting up when a single low noise block (LNB) is used and when only one pair of orthogonal receiving elements, in contrast to the transceiver 2 of the invention which includes at least two pair of orthogonal receiving elements 12.

Referring to the left-hand side of FIG. 3, showing a front view of a parabolic dish with a transceiver having a signal low noise block (LNB), the transceiver is rotated to align the orthogonal probes or receiving elements within the single waveguide with respect to the correct horizontal and vertical alignment of the incoming signals. In the example, the low noise block (LNB) is turned by 25 degrees with respect to a central vertical axis so that the two orthogonal probes of said transceiver are aligned with the vertical and horizontal polarization components of the incoming satellite signal.

On the right-hand side of FIG. 3, a portion of the earth is shown (which corresponds to the longitude and latitude ranges of Europe, but could be applied at other locations on earth), wherein the polarization tilt angular deviation, with respect to a central 0 degree reference, of the projected polarization components is illustrated for a geostationary satellite located in a 0 degree orbital location. The projection of the polarization components of the signals coming from a given satellite may for instance lead to a 20-degree polarization tilt angular deviation between Switzerland and Ireland.

Figure 4:
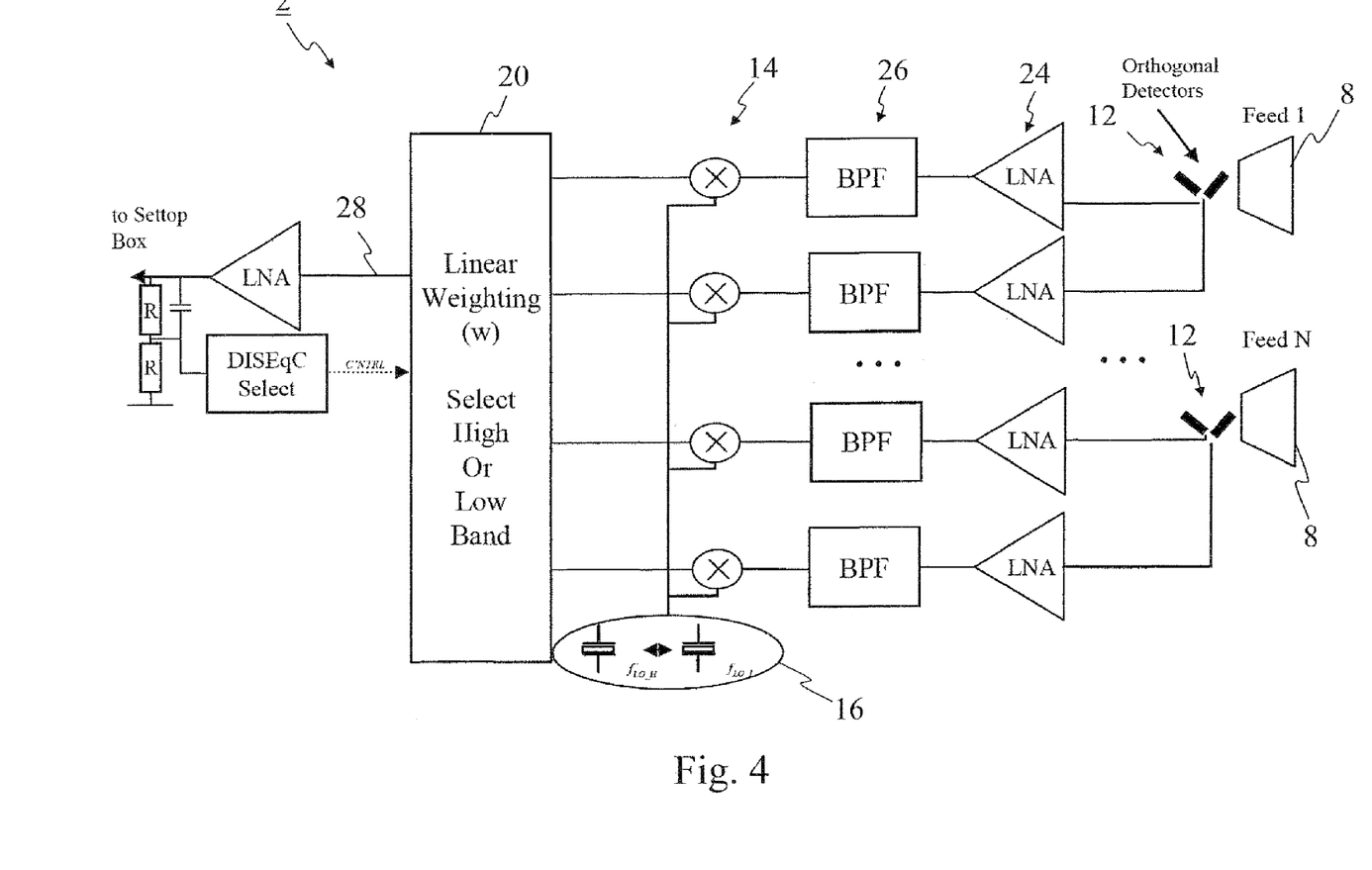
FIG. 4 schematically illustrates a transceiver according to one embodiment of the invention.

FIG. 4 schematically illustrates a transceiver 2 according to an embodiment of the invention. In comparison to the transceiver 2 illustrated in FIG. 1, low noise amplifiers (LNA) 24 and band pass filters (BPF) 26 are provided between each receiving element 12 and the corresponding mixer 14. The receiving elements 12 are provided before a first amplification stage.

In addition, the weight input unit 18 is formed within the combining unit 20. Two frequency bands, i.e. a high frequency band and a low frequency band, are received. To this end, two local oscillators 16 are provided and may be used: a local oscillator 16 with a frequency $f_{LO\_H}$ and a local oscillator 16 with a frequency $f_{LO\_L}$ may be used. A single frequency variable local oscillator 16 may also be used.

After combination of the converted signal components in the combining unit 20, based on the weights, the combined signal 28 is amplified using a low noise amplifier (LNA) and is fed to a set-top box. The weights ("C'NTRL" in FIG. 4) may be transferred from the set-top box to the combining unit 20 through a DiSEqC communication protocol or the like. DiSEqC, an abbreviation for Digital Satellite Equipment Control system, is a communication bus protocol for communication between satellite transceivers and peripheral equipment using a coaxial cable (more information may be obtained from the European Telecommunications Satellite Organization, Paris, France).

In one embodiment, a plurality of linear weight-based combining units 20 are integrated into the same transceiver 2 to serve multiple tuners in a set-top box or multiple set-top boxes connected to the transceiver 2. If multiple set-top boxes are connected to the same multi-front-end transceiver 2 according to an embodiment of the invention, the SatCR technology (of STMicroelectronics, Geneva, Switzerland) or the like may be used to communicate with the multiple set-top boxes using a single connecting coaxial cable. The SatCR technology combines up to eight input signals onto a single coaxial cable.

In one embodiment, the combining unit 20 is integrated in a housing separated from the front end part 8, 12, 24, 26, 14, 16 of the transceiver 2, and is connected to the front end part for forming the transceiver 2 as an add-on to an existing monoblock low-noise block unit providing a common local oscillator (LO) frequency reference for all input signals.

In one embodiment, after reception of the weights by the weight input unit 18, which may be integrated into the combining unit 20, the transceiver 2 is configured to electronically adjust, in a fine-tuning phase, the weights so as to optimize the angular directivity and polarization sensitivity and increase the signal-to-noise ratio of the signal of interest sent from both satellites 6 or of the distinct signals sent from each one of the satellites 6.

In one embodiment, the combination in the combining unit 20 is carried out through two steps, a first step consisting in combining separately the two converted signal components originating from one waveguide 8, and then combining the obtained signal components corresponding to each one of the at least two waveguides 8 together.

In the transceiver 2 illustrated in FIG. 4, the antenna front-end configurations provide N multiple input signals for the subsequent processing, wherein N is larger than or equal to 2. The amplified (LNA) and pre-filtered (BPF) signals are coherently combined, in the combining unit 20, by weighting each of the input signals appropriately (weighting coefficients $w_i$).

During fine-tuning, the weights or weighting factors $w_i$ may be updated using the knowledge of the static antenna pattern and the interference scenario for the considered wanted signal.

The complex weighting factors (amplitude and phase) may be updated following the optimization approach proposed in J. H. Winters, *Optimum Combining in Digital Mobile Radio with Cochannel Interference*, IEEE Journal on Selected Areas in Communications, Vol. SAC-2, No. 4, July 1984, but applied to satellite reception. The fine-tuning of the weighting factors may be carried out to adjust these factors (or weights) to the current interference and pointing situation. This may be achieved by measuring the signal-to-noise and interference ratio in the transceiver 2 and iteratively changing the weighting factors to approach the optimal setting.

Figure 5:
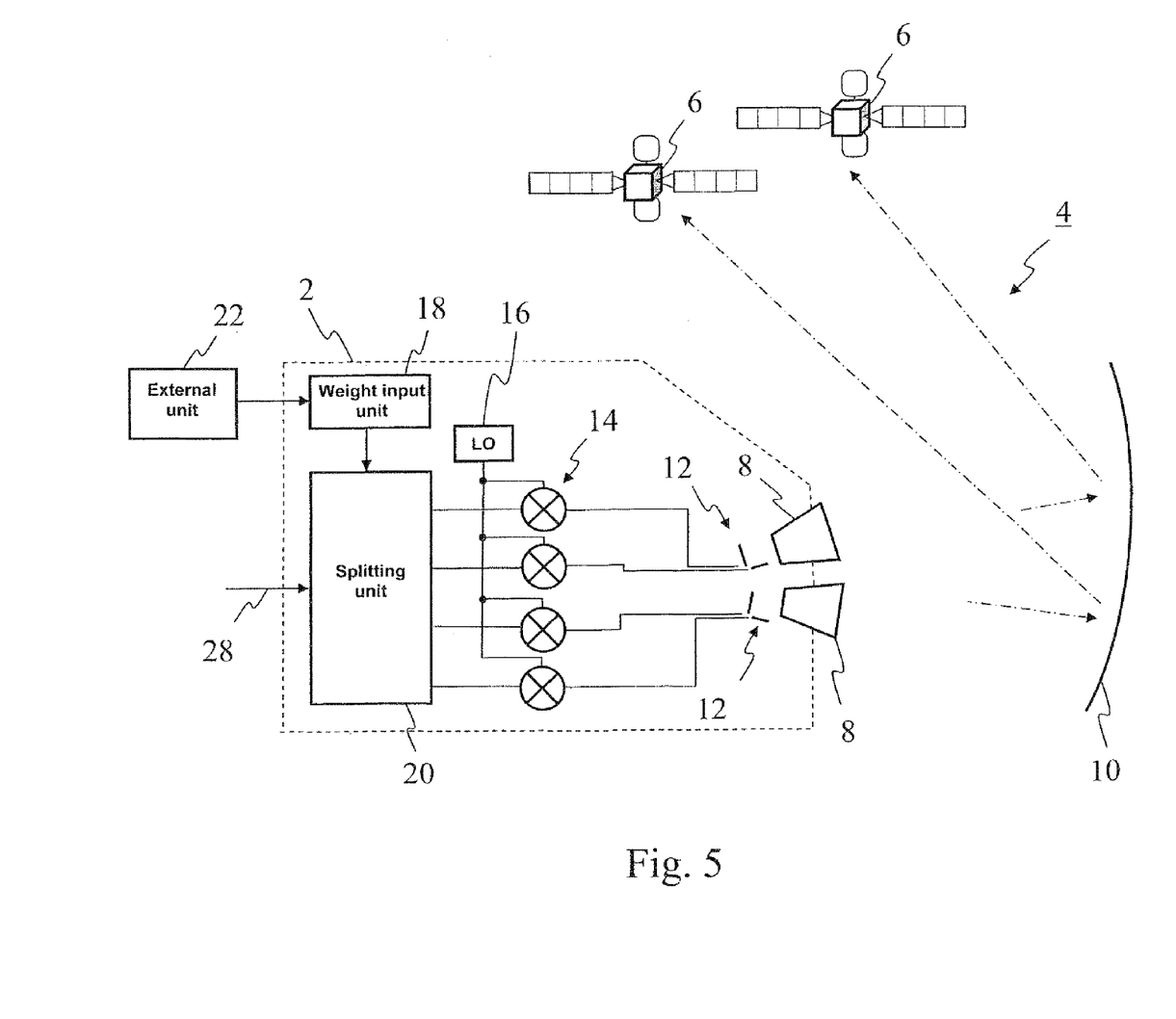
FIG. 5 schematically illustrates a transceiver according to one embodiment of the invention, wherein the transceiver is configured for transmitting signals to at least two satellites.

In one embodiment, the transceiver 2 is used for transmission of signals to satellites 6, either in addition to the reception or instead of the reception. The use of the transceiver 2 in transmitting terminals is a practical and useful application. The aggregate interference caused by many transmitting terminals into the adjacent band may cause problems to some satellite operators. A tedious installation procedure is normally required (especially, but not only, for VSAT systems) and even that does not guarantee that over time the terminals do not start to loose their accuracy in pointing due to external influences.

This embodiment is schematically illustrated in FIG. 5. One or more than one input signals 28 are received at a splitting unit 20. Although only one arrow is illustrated as arriving to the splitting unit 20, more than one input signal 28 may be fed into the splitting unit 20. There may also be more than one splitting unit 20 (not illustrated).

The splitting unit 20 is configured to split each one of the input signals 28 into at least four signal components. The splitting operation is carried out, for instance using phase shifters and/or amplifiers, based on complex weights received from a weight input unit 18. The weight input unit 18 may be integrated within the splitting unit 20. The weights may be received by the weight input unit 18 from an external unit 22, such as a set-top box.

The signal components outputted from the splitting unit 20 are upconverted from an intermediate frequency to a radiofrequency carrier frequency adapted for convenient transmission to satellites G. The upconversion is carried out using a series of mixers 14, or more generally converting units 14, and a common local oscillator (LO) 16. Using a common local oscillator 16 enables to coherently upconvert the signals components.

The upconverted signals are then fed into the orthogonal transceiving elements 12 cooperating with waveguides 8 and a reflector 10 to transmit the signal components 4, forming linearly polarized signals, to the at least two satellites 6.

Any considerations presented above and herewith respect to the transceivers 2 configured for receiving linearly polarized downlink signals (i.e. from the satellites 6), including the transceivers 2 illustrated in FIGS. 1*a*, 1*b* and 4, as well as with respect to the mode of operating, advantages and addressed requirements (notably presented with reference to FIGS. 2 and 3) apply mutatis mutandis to the transceiver 2 configured for transmitting linearly polarized uplink signals (i.e. to the satellites 6).

In one embodiment, the transceiver 2 is not only used for satellites 6 in a geostationary orbit, but also used for receiving and transmitting signals to satellites in an inclined orbit, i.e. oscillating around a normal geostationary position. The weights may be adapted to follow the 24-hour movement (relative to the earth view point) of the satellite in an inclined orbit. Therefore, the weights may each be a function of time.

In one embodiment, the combining unit 20 of the transceiver 2 is not configured for or not only configured for linearly combining the input signals but the combining unit 20 of the transceiver 2 is configured for nonlinearly combining the input signals. In general, the combining unit 20 of the transceiver 2 may be configured for combining the input signals.

Where the term "unit" is used herewith (for instance in combining unit 20, splitting unit 20, weight input unit 18 or external unit 22), no restriction is made regarding how distributed the constituent elements of a unit may be. That is, the constituent elements of a unit may be distributed in different software or hardware components or devices for bringing about the intended function. Furthermore, some units may be gathered together for performing their functions by means of a combined, single unit. For instance, the combining unit 20 and the weight input unit 18 may be combined to form a single unit (as illustrated in FIG. 4), to perform the functionalities of both units.

The above-mentioned units may be implemented using hardware, software, a combination of hardware and software, pre-programmed ASICS (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Transceiver configured for receiving linearly polarized signals from at least two geostationary satellites, the transceiver including:
   at least a first waveguide and a second waveguide configured to respectively form with a reflector two receiving beam patterns with a maximum gain in angular directions different from each other;
   at one end of each one of the at least first waveguide and second waveguide, two receiving elements orthogonal to each other configured for respectively receiving two orthogonal polarization components of the signals, and thus forming at least four receiving elements configured for receiving at least four corresponding signal components;
   at least four converting units each configured for converting, by using a common local oscillator, one of the at least four signal components to an intermediate frequency, thus outputting at least four corresponding converted signal components;
   a combining unit configured for linearly combining the at least four converted signal components, based on weights representing phase shifting and/or amplification of signal components; and
   a weight input unit configured for receiving the weights.

2. Transceiver of claim 1, wherein the first waveguide, the second waveguide and the associated receiving elements are included in a single housing.

3. Transceiver of claim 1, wherein the weight input unit is configured for receiving the weights from an external unit.

4. Transceiver of claim 3, configured for updating the weights after receiving them from the external unit.

5. Transceiver according to claim 1, wherein the first waveguide and second waveguide have receiving beam patterns with a maximum gain in angular directions separated by between 1.5 and 10 degrees from each other.

6. Transceiver configured for transmitting linearly polarized signals to at least two geostationary satellites, the transceiver including:
   at least a first waveguide and a second waveguide configured to respectively form with a reflector two transmitting beam patterns with a maximum gain in angular directions different from each other;
   at one end of each one of the at least first waveguide and second waveguide, two transmitting elements orthogonal to each other configured for respectively transmitting two orthogonal polarization signal components of the signals, and thus forming at least four transmitting elements configured for transmitting at least four corresponding signal components;
   at least four converting units configured to output together the at least four corresponding signal components, by each converting into a carrier frequency, using a common local oscillator, one of at least four signal components to be converted;
   a splitting unit configured for outputting the at least four signal components to be converted, based on weights representing phase shifting and/or amplification; and
   a weight input unit configured for receiving the weights.

7. Transceiver of claim 6, wherein the first waveguide, the second waveguide and the associated transmitting elements are included in a single housing.

8. Transceiver of claim 6, wherein the weight input unit is configured for receiving the weights from an external unit.

9. Transceiver of claim 8, configured for updating the weights after receiving them from the external unit.

10. Transceiver according to claim 6, wherein the first waveguide and second waveguide have transmitting beam patterns with a maximum gain in angular directions separated by between 1.5 and 10 degrees from each other.

11. Transceiver according to claim 6, configured for transmitting linearly polarized signals to at least two satellites which, instead of being geostationary, are in an inclined orbit or are such that one of the at least two satellites is geostationary and another one of the at least two satellites is in an inclined orbit.

12. Transceiver according to claim 6, wherein at least one of the following applies:
   the splitting unit is configured to operate in the carrier frequency after upconversion instead of before downconversion;
   the splitting unit is configured to operate in a linear and/or nonlinear manner to synthesize the at least four signal components signals to be converted.

13. Use of a transceiver according to claim 6 for transmitting linearly polarized signals to at least two geostationary satellites, at least two satellites in an inclined orbit, or at least one geostationary satellite and at least one satellite in an inclined orbit.

14. Use according to claim 13, including a sending procedure for sending weights from an external unit to the transceiver so as to configure the transceiver.

15. Use of a transceiver according to claim 6
   for transmitting linearly polarized signals to at least two geostationary satellites capable of receiving signals bearing the same content; or
   for transmitting linearly polarized signals to at least two geostationary satellites capable of receiving signals bearing different content.

16. Non-transitory computer-readable medium encoded with instructions that, when executed on a transceiver according to claim 4, update the weights after receiving the weights from the external unit.

17. Set-top box configured for sending weights to and for use by a transceiver according to claim 6.

18. Transceiver of claim 1, wherein the weight input unit is configured for receiving the weights from a set-top box.

19. Transceiver of claim 6, wherein the weight input unit is configured for receiving the weights from a set-top box.

20. Use according to claim 13, including a sending procedure for sending weights from a set-top box to the transceiver so as to configure the transceiver.

21. Transceiver according to claim 1, configured for receiving linearly polarized signals from at least two satellites which, instead of being geostationary, are in an inclined orbit or are such that one of the at least two satellites is geostationary and another one of the at least two satellites is in an inclined orbit.

22. Transceiver according to claim 1, wherein at least one of the following applies:
- the combining unit is configured to operate in the carrier frequency before downconversion instead of after downconversion;
- the combining unit is configured to nonlinearly combine the at least four converted signal components signals, instead or in addition to linearly combining the at least four converted signal components signals.

23. Use of a transceiver according to claim 1, for receiving linearly polarized signals from at least two geostationary satellites, at least two satellites in an inclined orbit, or at least one geostationary satellite and at least one satellite in an inclined orbit.

24. Use according to claim 23, including a sending procedure for sending weights from an external unit to the transceiver so as to configure the transceiver.

25. Use of a transceiver according to claim 1,
- for receiving linearly polarized signals from at least two geostationary satellites sending signals bearing the same content; or
- for receiving linearly polarized signals from at least two geostationary satellites sending signals bearing different content.

26. Set-top box configured for sending weights to and for use by a transceiver according to claim 1.

* * * * *